United States Patent
Pelkonen et al.

(10) Patent No.: US 9,319,437 B2
(45) Date of Patent: Apr. 19, 2016

(54) CONNECTION ANALYSIS IN COMMUNICATION SYSTEMS

(75) Inventors: Henri Timo Johannes Pelkonen, Oulu (FI); Jyrki Petteri Berg, Lempäälä (FI); Sampo Kristian Torikka, Tampere (FI); Tiina Maarit Karppinen, Tampere (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 139 days.

(21) Appl. No.: 13/515,553

(22) PCT Filed: Nov. 4, 2010

(86) PCT No.: PCT/EP2010/066837
§ 371 (c)(1),
(2), (4) Date: Aug. 28, 2012

(87) PCT Pub. No.: WO2011/072948
PCT Pub. Date: Jun. 23, 2011

(65) Prior Publication Data
US 2012/0327798 A1 Dec. 27, 2012

(30) Foreign Application Priority Data
Dec. 16, 2009 (EP) .................................. 09179537

(51) Int. Cl.
*H04L 29/06* (2006.01)
*H04L 12/26* (2006.01)
(Continued)

(52) U.S. Cl.
CPC ........ *H04L 65/1043* (2013.01); *H04L 41/0896* (2013.01); *H04L 43/0882* (2013.01); *H04L 65/103* (2013.01); *H04L 1/0014* (2013.01); *H04L 65/1013* (2013.01); *H04L 65/1023* (2013.01)

(58) Field of Classification Search
CPC . H04L 12/262; H04L 1/0014; H04L 41/0896; H04L 43/0882; H04L 69/04; H04L 65/103; H04L 65/1023; H04L 65/1013
See application file for complete search history.

(56) References Cited

U.S. PATENT DOCUMENTS 6,466,556 B1 * 10/2002 Boudreaux ........... H04W 36/12
370/331
7,245,589 B2 * 7/2007 Neulist et al. .................. 370/254
(Continued)

FOREIGN PATENT DOCUMENTS

WO    WO03/107618 A1    12/2003
WO    WO 2009/015461 A1    2/2009

OTHER PUBLICATIONS

Schulzrinne et al ("RTP: A Transport Protocol for Real-Time Applications" published Jul. 2003).*
(Continued)

*Primary Examiner* — Raj Jain
(74) *Attorney, Agent, or Firm* — Squire Patton Boggs (US) LLP

(57) ABSTRACT

A method of generating an analyzed call record comprising the steps of: providing control plane information identifying a plurality of terminations established at a gateway involved in the call; providing user plane information related to terminations used in the call; providing user plane measurement data being associated with respective terminations; analyzing the user plane measurement data in order to produce respective quality indications for respective ones of the plurality of terminations; generating enhanced user plane information incorporating the respective quality indications; and associating together the control plane information and the enhanced termination reports.

18 Claims, 6 Drawing Sheets

(51) Int. Cl.
*H04L 12/24* (2006.01)
*H04L 1/00* (2006.01)

(56) References Cited

U.S. PATENT DOCUMENTS

| | | | |
|---|---|---|---|
| 7,430,179 B2* | 9/2008 | Towns-von Stauber et al. | 370/252 |
| 7,590,070 B1* | 9/2009 | Asawa | H04L 1/0014 370/230 |
| 7,996,012 B2* | 8/2011 | Wigell | H04W 88/181 370/465 |
| 8,050,219 B2* | 11/2011 | Thakare | 370/328 |
| 8,351,344 B2* | 1/2013 | Jung et al. | 370/252 |
| 2002/0150092 A1* | 10/2002 | Bontempi | H01L 12/1818 370/389 |
| 2005/0195762 A1* | 9/2005 | Longoni | H04L 65/1069 370/328 |
| 2006/0146703 A1* | 7/2006 | Cha et al. | 370/229 |
| 2006/0153174 A1 | 7/2006 | Towns-von Stauber et al. | |
| 2009/0034426 A1* | 2/2009 | Luft et al. | 370/252 |
| 2012/0327798 A1* | 12/2012 | Pelkonen | H04L 65/103 370/252 |

OTHER PUBLICATIONS

Megaco/H.248 Ericsson AB 3.13, Nov. 23, 2009.
International Search Report and Written Opinion corresponding to International Patent Application PCT/EP2010/066837 dated Dec. 16, 2010.

\* cited by examiner

CONNECTION ANALYSIS IN COMMUNICATION SYSTEMS

This invention relates to connection analysis in communication systems. It is particularly, but not exclusively related to mobile communication systems.

Modern mobile communications systems have radio access networks which provide radio connectivity to mobile terminals and a core network which essentially handles mobility management and switching and routing of transmission of data, such as voice calls and data calls, for example in transferring multimedia content, audio, video, and data.

In order to handle the different types of traffic in a mobile communications system, gateways are provided. A gateway is a translation device or service capable of converting digital media streams within a telecommunications network or between disparate telecommunications networks, such as between a cellular network and a public switched telephone network (PSTN). This translation is typically conversion between different transmission and/or coding techniques. A gateway is typically used to control connections at the junction point between circuit-switched and packet-switched networks.

Gateways also enable multimedia communications across telecommunications networks over multiple transport protocols such as Asynchronous Transfer Mode (ATM) and Internet Protocol (IP).

In one type of gateway, referred to as a "decomposed" gateway, there is a separation between a part dealing with call signaling and a part dealing with bearer control. In such a "decomposed" gateway a part handling bearer connections is referred to as a media gateway (MGW), and a part handling call control is referred to as a media gateway controller (MGC). The MGC is also sometimes referred to as a call agent or a softswitch. The MGC dictates the service logic of traffic.

The MGW connects different types of digital media streams together to create an end-to-end path for media (voice and data) in a call. It may have interfaces to connect to traditional PSTN networks. It may have interfaces to connect to ATM and IP networks, and Ethernet interfaces to connect VoIP calls. The MGC instructs the MGW to connect media streams between these interfaces to connect the call in a way which is transparent to end-users.

Communication between MGWs and MGCs is achieved by means of various protocols including the media gateway control protocol (MGCP), also referred to as the Megaco protocol or H.248 protocol, and the Session Initiation Protocol (SIP). The Megaco/H.248 protocol is a master/slave communications protocol which is used for control of elements in a physically decomposed gateway. It is used to instruct a MGW to connect streams coming from outside a packet or cell data network onto a packet or cell stream such as the Real-Time Transport Protocol (RTP).

The MGC controls the MGW by sending Megaco/H.248 command messages to manipulate terminations, contexts, events, and signals.

The Megaco/H.248 protocol handles two basic connection-related entities: terminations and contexts. A termination represents a stream entering or leaving the MGW (for example, analogue telephone lines or RTP streams). A termination can represent a physical connection in the form of, for example, time slots or a logical connection, and can be persistent (circuit based) or ephemeral (streams set up and torn down within the course of a call). Terminations have properties, such as the maximum size of a jitter buffer, which can be inspected and modified manually directly from the MGW.

Terminations may be placed into contexts, which are defined as when two or more termination streams are mixed and connected together. A context associates collections of terminations and describes the media switching and mixing parameters as well as topology of the associations when more than two terminations exist. A connection is made when two or more terminations are placed in the same context. A context can have many terminations, but a termination can only exist in one context at a time. Contexts are created and released by the MGW under command of the MGC. A context is created by adding the first termination, and it is released by removing (subtracting) the last termination.

A termination may have more than one stream, and therefore a context may be a multi-stream context. Audio, video, and data streams may exist in a context among several terminations.

FIG. 1 shows a system architecture 100 comprising a radio access network 102, a core network 104 comprising MGWs 106 through which an Internet Protocol (IP) backbone 108 passes, and switching capability 110 comprising a mobile switching centre server (MSS) which controls the MGWs 106 according to its functionality as a mobile switching centre (MSC).

The radio access network comprises base stations 114 which are capable of establishing connections with mobile terminals 116 over an air interface 118 and radio network controllers (RNCs) 112, 120 which control the operation of the base stations 114 and also link the base stations 114, and thus the mobile terminals 116, to the MGWs 106. Each MGW 106 comprises a transcoding unit 122 which encodes and decodes speech, as well as handling data rate adaptation, and a signaling unit 124. The signaling unit 124 contains a bearer control level which forms contexts and manages physical resource reservation for terminations.

As can be seen in FIG. 1, a number of MGWs 106 are linked together to route the routing user plane through a network. At each end, the MGWs 106 terminate with a connection to a radio network controller 120. This is the case in the present embodiment shown in FIG. 1 which is a 3G network, such as a WCDMA network. However, the MGWs 106 may be connected to base station controllers (BSC) in a 2G network, such as a GSM network, or to a PSTN.

Each MGW 106 has terminations 126 and 128, 130 and 132, and 134, and 136 which are the points at which data is received by and is transmitted from its transcoding unit 122.

The switching capability 110 is an MSS. It includes MSC functionality and also includes MGC functionality which enables it to control the MGWs by using the Megaco/H.248 protocol as is described in the following.

The route taken by data from one user to another and the protocols which facilitate the actual data transmission is referred to as the user plane. In FIG. 1, it is the path from one mobile terminal to another presented as the air interfaces 118 between a mobile terminal and its respective base station and the dotted line linking the base stations together extending through the IP backbone 108 of the system architecture 100.

The operation of the MGWs 106 in the user plane is controlled by a so-called control plane comprising the functions defining aspects of network signaling and control, such as call control and connection control. In the case of this embodiment, the control plane is represented by control plane level functionalities of the signaling units 124 of the MGWs 106 and the MGC functionality of the MSS 110. The MGC functionality controls the MGWs 106 by sending Megaco/H.248 command to manipulate terminations, contexts, events, and signals.

Megaco/H.248 commands which are received by the MGWs 106 from the MSS 110 are provided to the signaling units 124 and are processed in their control plane level. The signaling units 124 control the transcoder units 122 across the user plane/control plane boundary to make resource reservations for user plane signaling. They use IP connection data to instruct a resource reservation application where to deliver and switch actual speech frames. The transcoder units 122 carry out decoding and encoding of the speech frames.

Each MGW includes several virtual MGWs (VMGWs). Typically there is one VMGW inside each signaling unit 124. Every VMGW has a H.248 transaction handler block which is connected to a corresponding H.248 transaction handler block in the MGC functionality of the MSS. Therefore, each signaling unit 124 has its own link to the MGC functionality which is managed by the VMGW. This H.248 transaction handler block in a signaling unit 124 splits Megaco/H.248 protocol messages into smaller message entities to be handled by bearer control program blocks in the signaling unit which are generated to handle contexts with each context having own instance of a bearer control program block. When terminations within a context are released and their related context is released, the associated instance of the bearer control program block is ended.

An example of a call being made and the switching invoked in the user plane will now be described. A subscriber makes a call at a mobile terminal and this is initially handled by the 3G radio access network, in particular the radio network controller 112. The radio network controller 112 informs the MSS 110 about an upcoming call. The MSS 110 determines a suitable call route, makes a decision to deliver the call through appropriate MGWs and sends to them the necessary Megaco/H.248 commands. The MSS 110 responds to the radio network controller 112 with information about the termination (that is IP/UPD (user datagram protocol) related information) of the MGW MGW1 and the radio network controller 112 starts user plane signaling towards the MGW MGW1.

The MSS 110 requests the MGW MGW1 with remote termination transport information to reserve a context CTX1 and a termination Termination A 126 towards the radio network controller 120. The MGW MGW1 sends an AddReply ok message together with local termination transport information to the MSS 110. The MSS, knowing the identities of the calling (subscriber A) and called (subscriber B) parties, calculates the optimal path between them and then commands each MGW in the calculated path, that is MGWs MGW1, MGW2, and MGW3, to switch terminations. The MSS commands the MGW MGW1 to reserve a new termination Termination B 128 to the context CTX1 by sending a Megaco/H.248 AddRequest message. The AddRequest message contains the context identifier CTX1. The MGW MGW1 sends an AddReply message to the MSS with local transport information about the termination Termination B 128. The MSS modifies the user plane topology to the MGW MGW1 context CTX1 to connect the termination Termination A 126 and the termination Termination B 128 so that the user plane goes through the termination Termination A 126 and the termination Termination B 128.

The MSS requests the MGW MGW2 to reserve a context CTX2 with a termination Termination C 130 with transport information towards the MGW MGW1. The MGW MGW2 replies with an AddReply Termination C ok message. The MSS commands the MGW MGW2 to reserve a termination Termination D 132 to the context CTX2 towards the MGW MGW3. The MSS modifies user plane topology to the MGW MGW2 context CTX2 to connect the termination Termination C 130 and the termination Termination D 132 so that the user plane goes through the termination Termination C 126 and the termination Termination D 128.

The MSS requests the MGW MGW3 to reserve a context CTX3 with a termination Termination E 134 with transport information towards the MGW MGW2. The MGW MGW3 replies with an AddReply Termination E ok message. The MSS requests the MGW MGW3 to reserve a termination Termination E 136 towards the radio network controller 120 with RNC2 transport information. The MGW MGW3 replies to MSS with an AddReply Termination F ok message. The MSS modifies user plane topology to the MGW MGW3 context CTX3 to connect the termination Termination E 134 and the termination Termination F 136 so that the user plane goes through the termination Termination E 134 to the termination Termination F 136

The MGW MGW1 and the MGW MGW2 establish a connection from the termination Termination B to the termination Termination C by negotiating between themselves. The MGW MGW2 and the MGW MGW3 establish a connection from the termination Termination D to the termination Termination E by negotiating between themselves.

As a result, the call is routed from the radio network controller 112 to the radio network controller 120 through the MGWs and the subscriber A can speak with the subscriber B.

When the call is ended, for example by one of the subscribers terminating it, the MSS 110 requests the MGWs to release the contexts CTX1, CTX2, and CTX3 in the MGWs MGW1, MGW2, and MGW3.

The system architecture of FIG. 1 is presented in another way in FIG. 2. This Figure shows the interfaces present between various network elements and measurements which are made or can be calculated between terminations. It shows a mobile terminal communicating with a base station (BTS) over an air interface, the BTS communicating with an RNC within the radio access network, the RNC communicating with a MGW via ATM over the Iu interface, and inter-MGW communication along the IP backbone. Various measurements can be made such as frequency offset and radio frame erasure ratio (FER) between the mobile terminal and the Iu interface, jitter, packet loss, and link FER over the Iu interface, link FER between various network elements, Total FER and mean opinion score (MOS) between the mobile terminal and the nearest MGW, and jitter, packet loss, link FER, and MOS between MGWs.

The MOS value is a widely used characteristic used to evaluate speech quality. It is a five level scale from bad (1) to excellent (5) and is based on the speech quality as it would be perceived by a listener.

Various things can go wrong with a call. For example, speech frames can be lost at the air interface 118 during handover which may result in a period of time during which a called subscriber B cannot hear a calling subscriber A. In another example, the IP backbone controlled by a network operator may not be behaving correctly. This might be caused by too much load in the network or a variable link quality. This may cause the routing protocol to switch the routing path in the network and, as a result, real-time protocol (RTP) packets may be dropped. This can also lead to frame loss. As a result, one subscriber may not be able to hear another or the call may be released.

According to a first aspect of the invention there is provided a method of generating communication connection analysis, the method comprising the steps of:

providing control plane information identifying a plurality of terminations established at a network element involved in a communication connection;

providing user plane information involved in the communication connection in respect of the plurality of terminations;

providing user plane measurement data being associated with respective terminations;

analysing the user plane measurement data in order to produce respective quality indications for respective ones of the plurality of terminations;

generating enhanced user plane information incorporating the respective quality indications; and associating together the control plane information and the enhanced termination reports.

The communication connection may be handled by a communications system. It may be handled by a mobile communications system.

Preferably the communication connection is a call. The connection may be from subscriber to subscriber. It may be a data call.

Preferably, the network element routes the connection through the user plane. The connections may be routed through a number of network elements.

Preferably, the network element is a gateway. It may be a media gateway. It may be a decomposed gateway having a part handling bearer connections and a part handling call control. The part handling call control may be located in a switching functionality. The part dealing with bearer control may be located in a gateway functionality.

The part handling call control may use a gateway control protocol to control the part handling bearer connections. It may send gateway control protocol commands to manipulate terminations, contexts, and signals.

Preferably, the network element comprises a transcoding unit which encodes and decodes speech. The transcoding unit may also handle data rate adaptation. Preferably, the network element comprises a signaling unit. The signaling unit may contain a bearer control level which forms contexts and manages physical resource reservation for terminations.

Preferably, the user plane information is a termination report. It may be a termination report generated in a first network element. It may be generated in a first network element which is involved in routing the connection.

A termination report may define the nature of a termination in the gateway. A termination report may comprise a plurality of data items. It may comprise the location of the termination in the network. It may comprise the direction of the call in terms of the termination. It may comprise the resources used in respect of the termination.

A termination report may comprise a context identifier, a termination identifier, a termination start time, a termination stop time, and a gateway identifier.

Preferably, the user plane measurement data is provided by transcoding units. The user plane measurement data may be provided by DSPs in the transcoding units. The user plane measurement data may relates to packet loss. It may relate to jitter. It may relate to FER.

When the connection is ended, bearer control may request the user plane measurement data to be provided. It may request it from a transcoding unit.

Preferably, the control plane information is data items associated with the gateways being controlled in the connection being routed through the network. The control plane information may be a context report. It may be a context report generated in a second network element. The control plane information may be generated in a network element which is different to the first network element. Preferably, the control plane information is generated in a switching functionality, for example a switching centre such as an MSS.

Once the connection is ended, the switching functionality may use the control plane information to create a context report which is sent to a call report server. A context report may be generated in respect of each context.

A context report may comprise a context identifier, a context start time, a context stop time, and a gateway identifier. The gateway identifier may be a gateway address such as an IP address. It may relate to a virtual gateway.

The control plane information and/or the context report may be associated with a global call reference identifier that uniquely identifies the connection within a communication system.

When the connection is ended, the second network element may request the first network element to release its context. At this point, bearer control in the first network element may save various data items including a termination reservation start time, a reservation release time, a context identifier, a gateway identifier, and a termination identifier.

The communication system may comprise an analysis and database functionality. This may comprise a call report server and an analysis server. Preferably, the user plane measurement data is analysed in the analysis server. Preferably, the analysis server is functionally separate from, although connected to, the first network element. That is, the analysis server does not provide commands to the first network element in order to control its operation in terms of the function it is to carry out in the communications system. Preferably, the call report server is functionally separate from, although connected to, the second network element. That is, the call report server does not provide commands to the second network element in order to control its operation in terms of the function it is to carry out in the communications system.

The analysis server may receive user plane information from the network element. The analysis server may use the user plane measurement data to calculate at least one quality related parameter in respect of each termination. It may calculate a MOS value, an R-VALUE, or both. It may produce other quality related parameters.

The analysis server may generate enhanced termination reports. They may be provided to the call report server.

The call report server may receive reports in respect of user plane information and control plane information and store them in one or more databases. Various data items may be associated with each other within the database and/or between databases. Reports in respect of control plane information may be associated with each other on the basis of a particular global call reference identifier. Reports in respect of user plane information and in respect of control plane information may have common data items which allow these different types of reports to be associated with each other when they are related to each other.

Preferably, the call report server is able to combine the control plane information and the user plane information to produce subscriber based voice quality reports.

The call report server may be used to investigate the connection once it has ended. This may be in the event that there were quality problems encountered by a subscriber while the connection was in existence.

A network operation may make a work flow query based on a time at which a problem occurred and a subscriber identifier, such as a subscriber number like an IMSI.

The work flow query carried out in the call report server may lead to a report being produced showing every termination related to the connection. As a result, the network operator may use the call report server to search according to subscriber identifier and/or global call reference identifier to analyse which happened during the existence of the connection.

Preferably, contexts in respect of gateways involved in the call are associated together. They may be associated together by using a common global call reference identifier. Associating together the contexts may associate together the terminations. In this way, all of the terminations may be associated together. In the case in which there is a quality indicator available in respect of all of these terminations, then a call record may be made available which can be examined in order to determine whether there were any problems associated with any of the terminations used in the call.

Preferably the gateway identifier is the identifier of a media gateway and in particular may be a virtual media gateway. Bearer control in the network element may save data items including a termination start time, a termination stop time, a context identifier, gateway identifier and termination identifier. One or more of these data items may be saved when a call is released.

According to the invention, user plane information may be combined with control plane information and the user plane measurements can be investigated in real time or when the connection has ended, for example in response to a customer complaint.

According to a second aspect of the invention there is provided a communication system comprising:
a first network element capable of:
establishing a plurality of terminations involved in a communication connection;
providing user plane information in respect of the plurality of terminations; and
providing user plane measurement data being associated with respective terminations;
a second network element capable of providing control plane information identifying the plurality of terminations established at the first network element;
a server capable of analysing the user plane measurement data in order to produce respective quality indications for respective ones of the plurality of terminations and generate enhanced user plane information incorporating the respective quality indications;
a database wherein the control plane information and the enhanced termination reports are associated together in order to generate communication connection analysis.

According to a third aspect of the invention there is provided an analysis server operating according to the first aspect of the invention.

According to a fourth aspect of the invention there is provided a call report server operating according to the first aspect of the invention.

According to a fifth aspect of the invention there is provided a computer program product comprising software code that when executed on a computing system performs a method of generating communication connection analysis, the method comprising the steps of:
providing control plane information identifying a plurality of terminations established at a network element involved in a communication connection;
providing user plane information involved in the communication connection in respect of the plurality of terminations;
providing user plane measurement data being associated with respective terminations;
analysing the user plane measurement data in order to produce respective quality indications for respective ones of the plurality of terminations;

generating enhanced user plane information incorporating the respective quality indications; and
associating together the control plane information and the enhanced termination reports.

Preferably, the computer program product has executable code portions which are capable of carrying out the steps of the method.

Preferably, the computer program product is stored on a computer-readable medium. It may be stored in a non-transitory manner.

An embodiment of the invention will now be described, by way of example only, with reference to the accompanying drawings in which.

Figure 3:
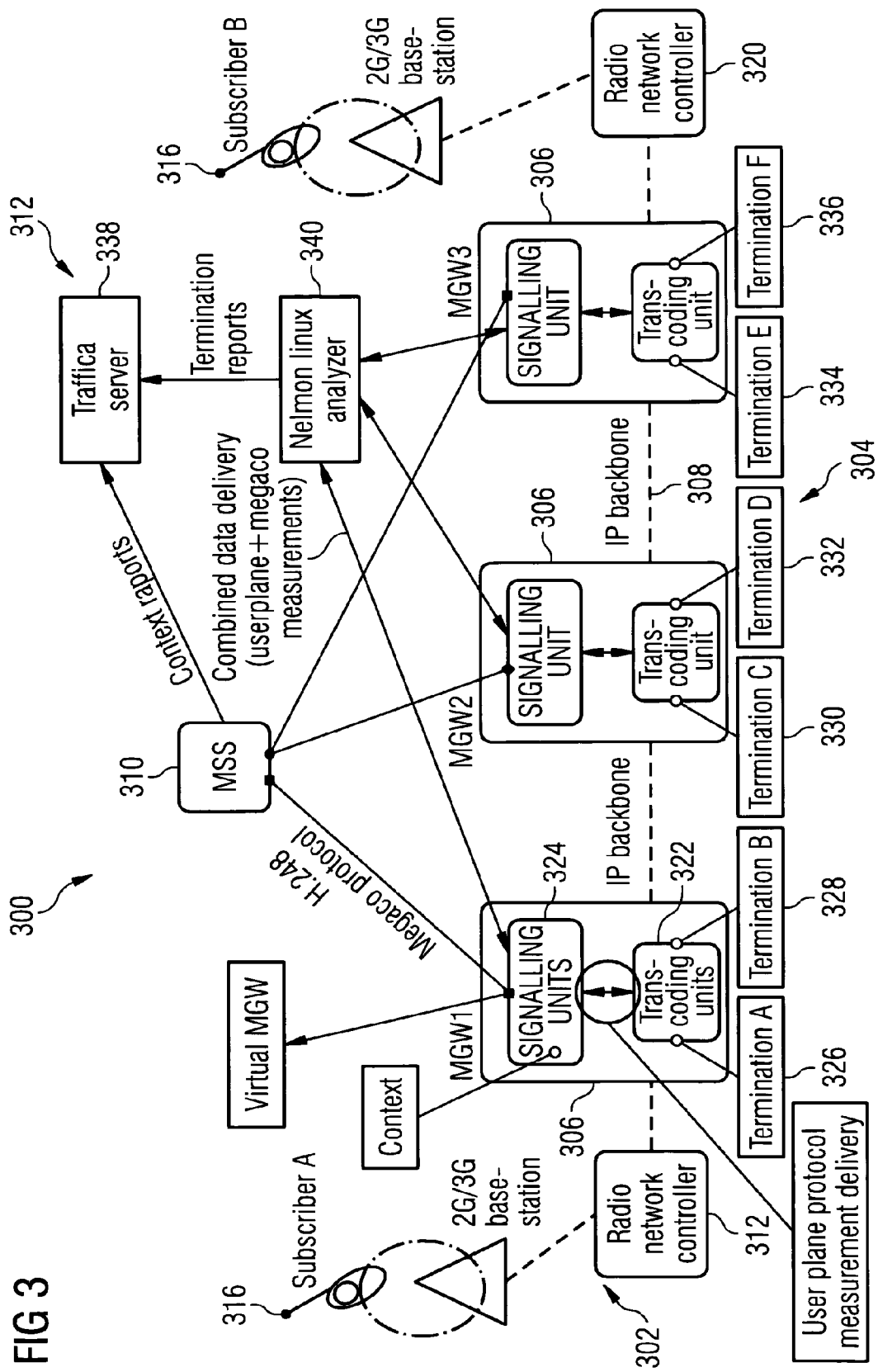
FIG. 3 shows system architecture according to the invention.

FIG. 3 shows a system architecture 300 according to the invention. The system architecture 300 is similar to the system architecture 100 of FIG. 1 and likewise comprises a radio access network 302, a core network 304 comprising media gateways 306 through which an Internet Protocol (IP) backbone 308 passes and a switching capability (MSS) 310 which controls the MGWs 306. Where these elements have configurations and operations which correspond to elements in the system architecture 100, they will not be further described.

In addition, the system architecture 300 comprises an analysis and database functionality 312 comprising a call report server 338 and an analysis server 340. In broad terms, the analysis and database functionality 312 analyses data from the MGWs 306 to produce analysed data and merges it with data from the switching capability 310 to produce connection reports.

Figure 1:
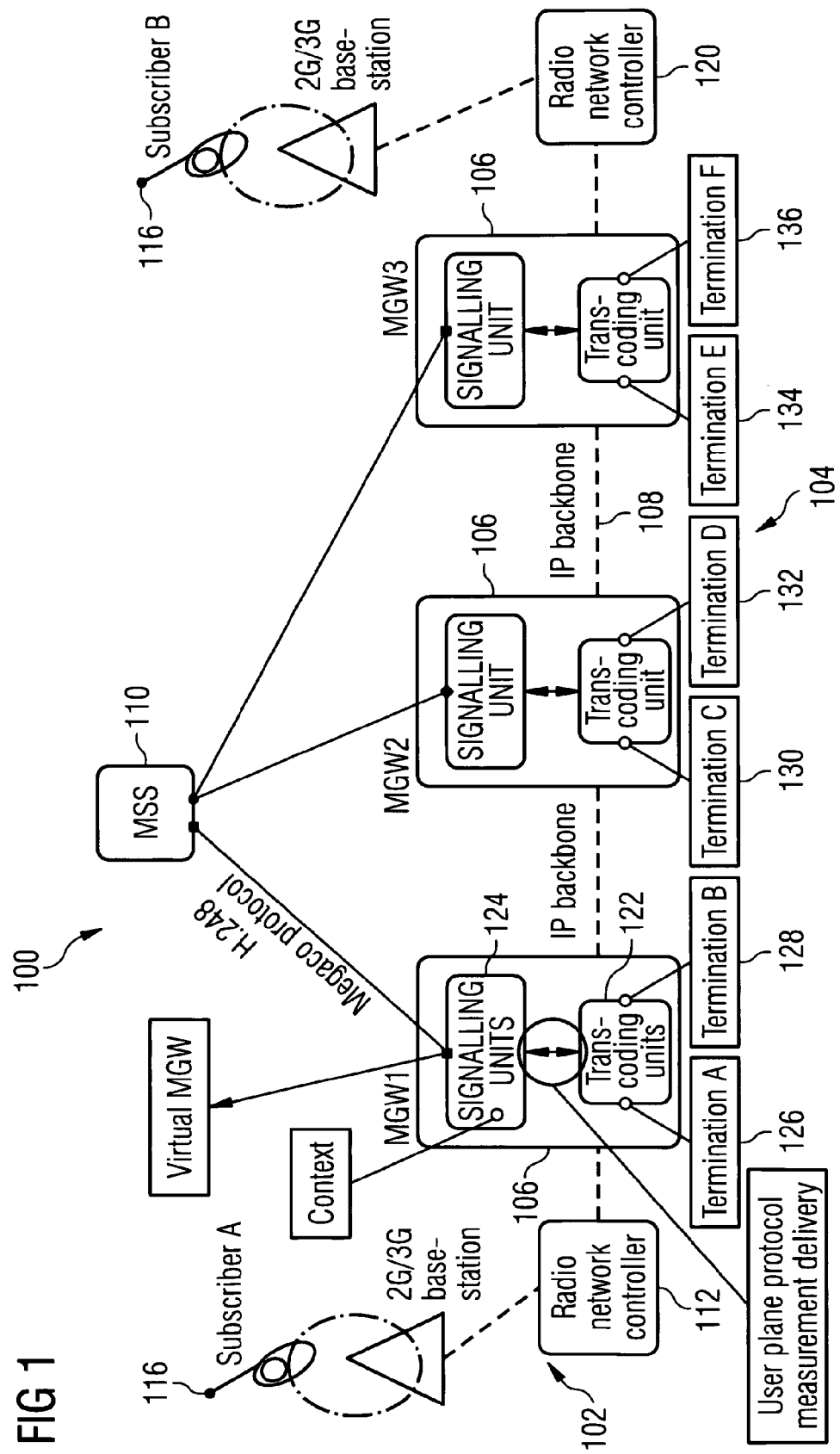
FIG. 1 shows a system architecture.
Figure 2:
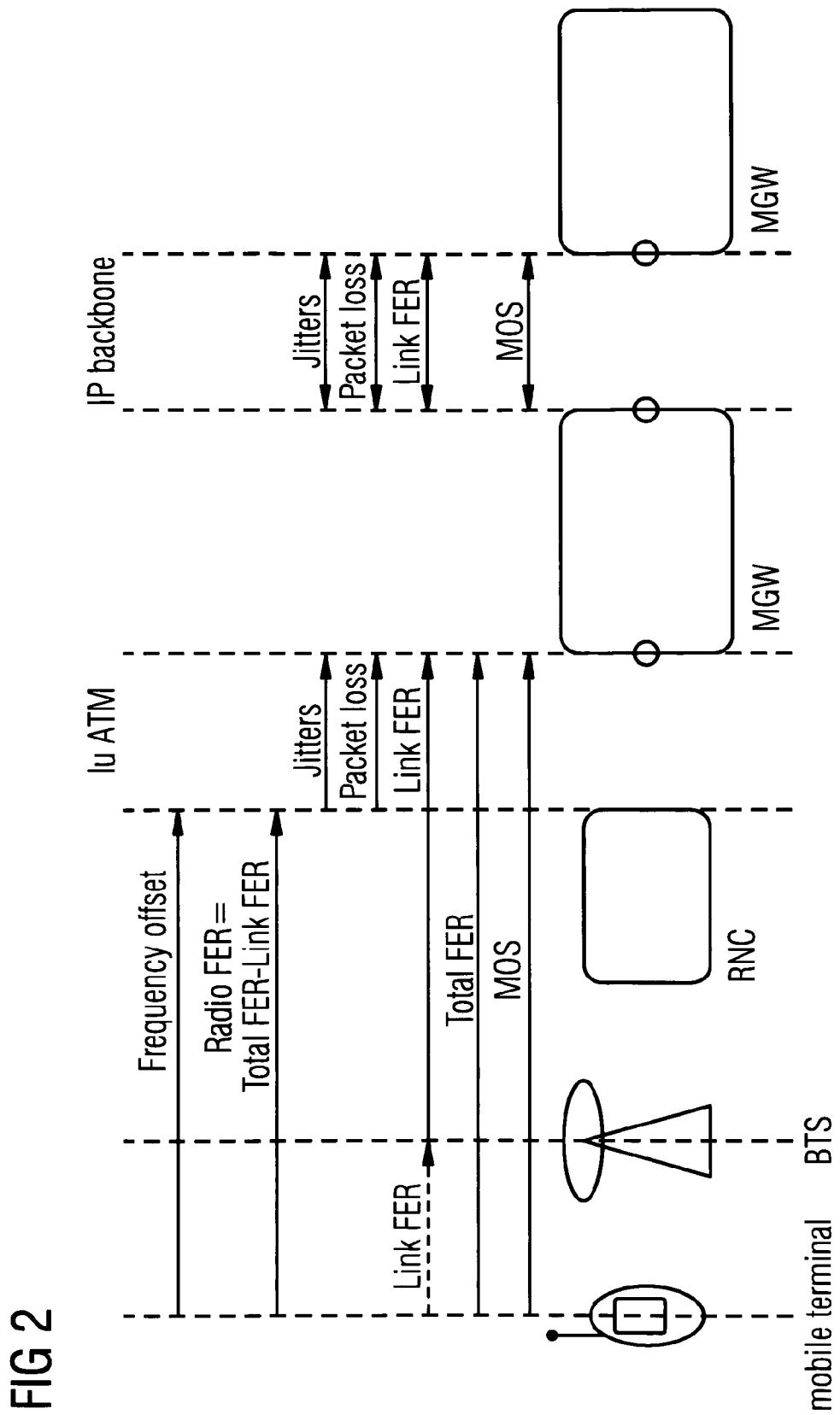
FIG. 2 shows interfaces present between various network elements and measurements.

The procedure of setting up a call is described in the foregoing in relation to FIG. 1.

Interaction between the media gateways and the analysis server 340 according to the invention will now be described. During a call Megaco/H.248 messages are exchanged between the MGC functionality and the MGWs. When the call is ended, the MSS 310 requests the MGWs to release their respective contexts CTX1, CTX2, and CTX3 in the MGWs MGW1, MGW2, and MGW3. At the point, bearer control in the MGWs saves the termination reservation start time, the termination reservation release time, the context ID, the virtual MGW IP address and the termination ID, that is context level data.

The bearer control within each MGW also requests user plane measurement data from digital signal processors (DSPs) located in the transcoding units 322 and so user plane measurements are obtained in respect of each termination. Therefore, in respect of FIG. 3, the transcoding unit 322 within an MGW 306 takes a measurement in respect of the termination Termination A 326 and a measurement in respect of the termination Termination B 328 and provides this measurement data to the signaling unit 324. The signaling unit 324 obtains the context level data, the user plane measurement data and transport level data (TDM circuit information, ATM interface information, and IP address information) and uses these different types of data to produce termination reports, one for the termination Termination A 326 and one for the termination Termination B 328. A termination report is created in respect of every termination and the termination reports are sent to the analysis and database functionality 312, and in particular to the analysis server 340.

The context level data can be considered to include data items used in the control of the MGWs by the MGC functionality. The transport level data can be considered to be the data items representing the physical connection ends present in the various elements of the network which are used in the call, or in other words, the data items defining how the user plane is routed through the network.

Figure 4:
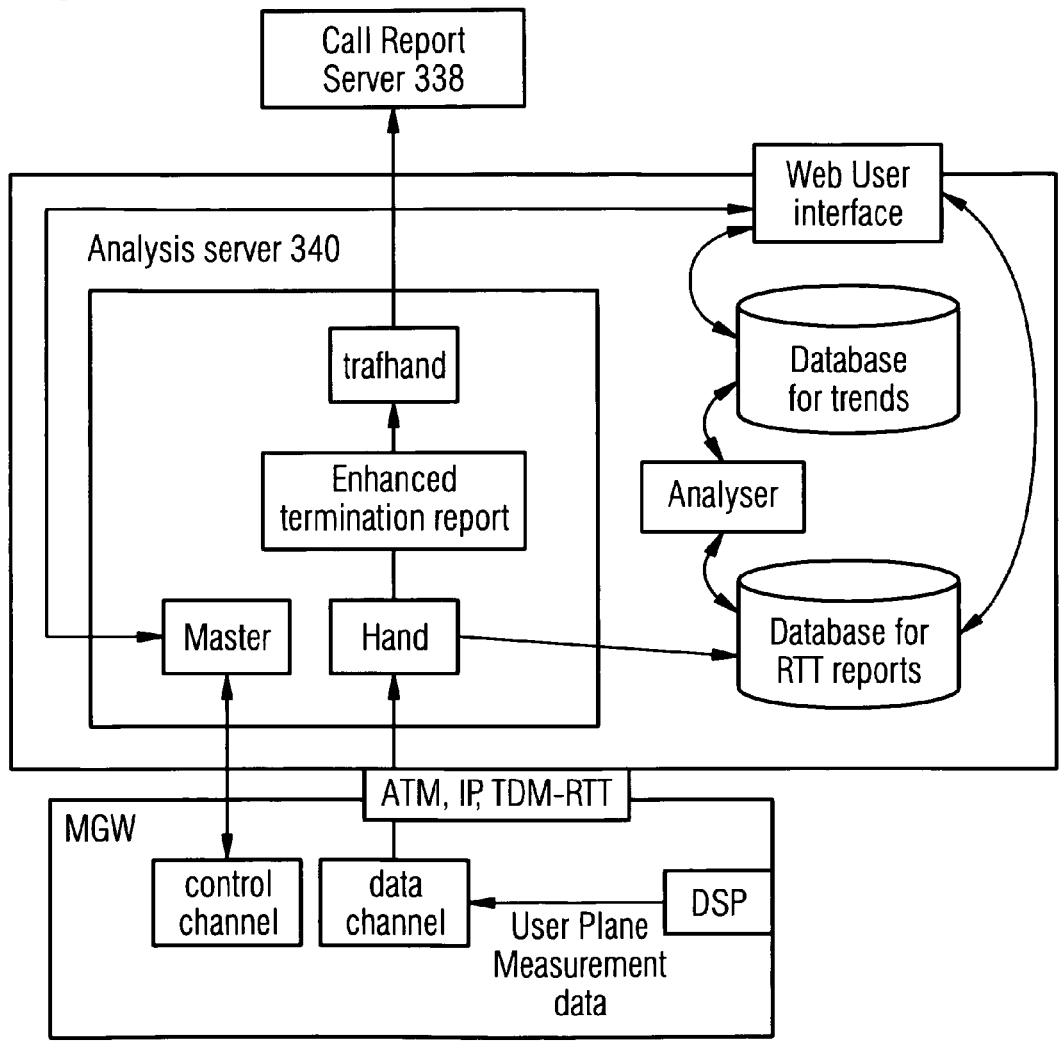
FIG. 4 shows a server according to the invention.

FIG. 4 shows the analysis server 340. This has a control block (MASTER) which controls communications between the analysis server 340 and the MGWs from which it receives data, a calculation block (HAND) for calculating quality related parameters and for producing enhanced termination reports, and a trafhand block which handles the enhanced termination reports and provides them to the call report server 338. The analysis server 340 also a database for real time (RTT) reports, a database for trends, and an analyser block.

When the analysis server 340 receives termination reports from the MGWs, they are first provided to the calculation block which uses user plane measurement data to calculate quality related parameters in respect of each termination. The calculation block may use the user plane measurement data to produce a MOS value, an R-VALUE, or both. It may produce other quality related parameters.

MOS value has been described in the foregoing. R-value is a number, or score, that is used to quantitatively express the subjective quality of speech. An R-value score can range from 1 (worst) to 100 (best), and is based on the percentage of users who are satisfied with the quality of a test voice signal.

The calculation block then provides the termination reports and the quality related parameters (together referred to as enhanced termination reports) to the database for RTT reports for data mining. It will be appreciated that the database for RTT reports will continually receive enhanced termination reports as time passes. Periodically, the analyser block carries out an analysis operation on recently received enhanced termination reports. Therefore, when a time for an analysis operation comes around, the analyser block has a new set of enhanced termination reports which have been newly received since the most recent analysis operation, and the analyser block transforms them into transformed data which is usable in order to carry out detailed investigation and assess trends. The transformed data is then stored in the database for trends. The data contained within the analysis server 340, and also data accessible from it, can be accessed by using a user interface which is able to interrogate the database for RTT reports, the database for trends, and the Master in order for a user to be able to review the operation of a system in different levels of detail, for example to investigate the operation of every physical interface or connection in a MGW. It can be TDM CGR number, physical ATM interface or specific IP destination network address and mask. For example, if the network operator is concerned about a specific GCR (a connection towards another network element), all enhanced termination reports for the specific GCR can be exported from the database and all measurement results for each termination and each parameter for the specific GCR and a selected time interval are visible and can be examined. In this case, the invention allows more detailed information of behaviour in respect to a specific CGR and allows more in-depth analysis of parameters which may reveal the origin of a problem.

Once the calculation block has produced the enhanced termination reports they are provided to the trafhand block which in turn provides them to the call report server 338.

The analysis server 340 is typically connected to between one and five media gateways and receives termination reports from each.

Now, the interaction between the MGWs 306 and the MSS 310 will now be described. As is described in the foregoing, the MSS 310 and relevant MGC functionality controls the MGWs to set up the call. This involves the generation and use of control plane data and relevant items of this data being stored in the MSS 310. Once the call is ended, the switching capability 310 uses this data to create context reports which are sent to the call report server 338. A context report is generated in respect of each context, and contains a context ID, context start time, context stop time, and a VMGW IP address. In addition, the MSS 310 obtains a global call reference identifier from a billing server which relates to the context and includes this with the context report. The context ID and VMGW IP address are obtained from Megaco protocol messages. Context reports are sent immediately on release of the context.

Figure 5:
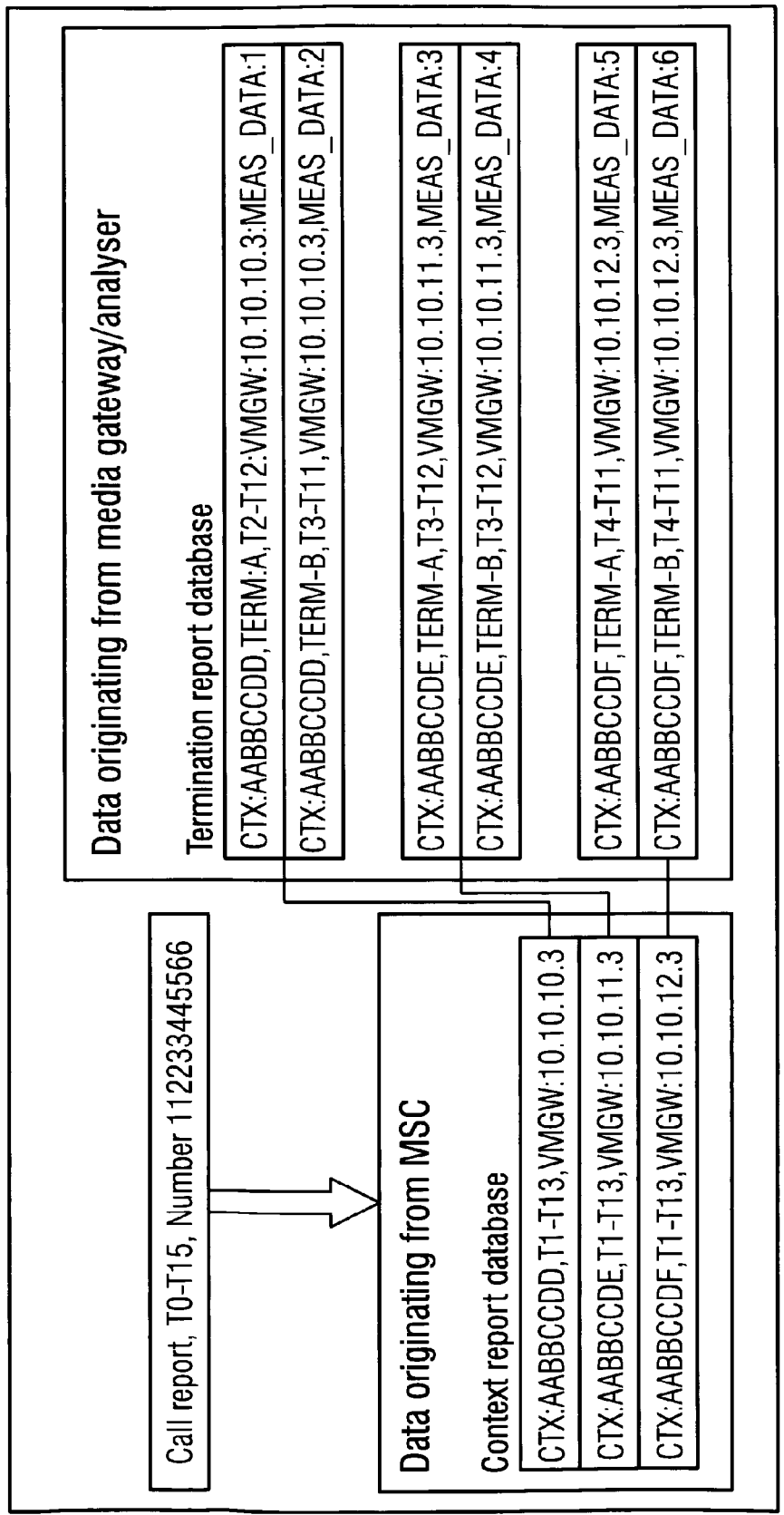
FIG. 5 shows a data structure present in a call report server.
Figure 6:
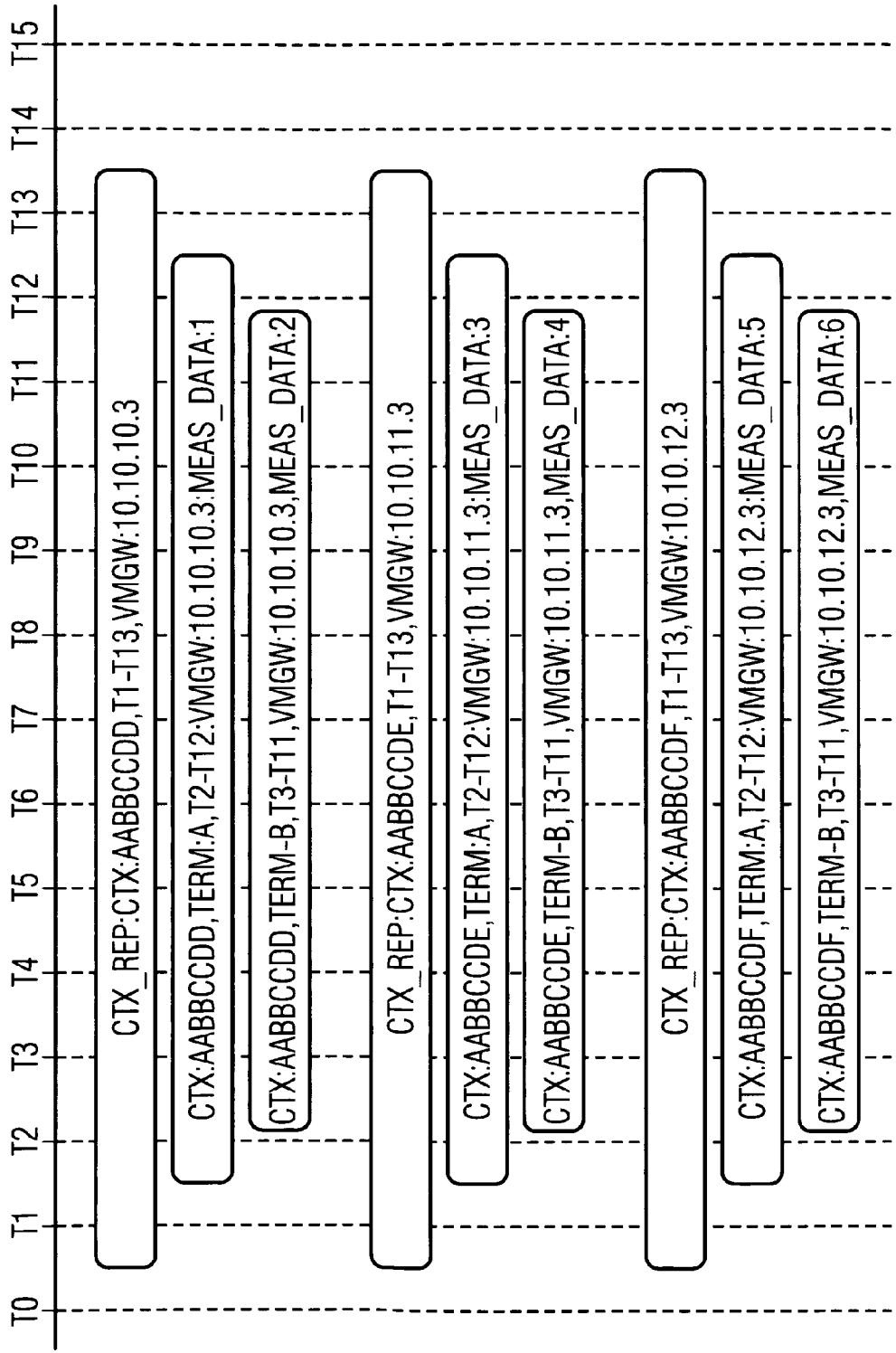
FIG. 6 shows time stamp information related to the data structure of FIG. 5.

Therefore, the call report server 338 receives termination reports from the MGWs and context reports from the MSS 310. The call report server 338 adds these reports to a context report database and a termination report database. Various data items can be associated with each other within each database and between the two databases. Since the context reports associated with a call are all related to a particular global call reference identifier, they can be associated together and stored in the context report database. The termination reports are stored in the termination report database. As is explained in the foregoing, since a termination report includes relevant start and stop (release) times, the context ID, and the virtual MGW IP address it is possible for individual termination data records in the termination report database to be associated with a corresponding data record in the context report database. As a result, within the call report server 338, data records in respect of contexts within a call can be associated together and individual data records of terminations can be associated with respective ones of these context data records. This can be seen in FIG. 5 which shows a data structure present in a call report server. FIG. 6, which is related to FIG. 5, shows time stamp information related to the data records in the data structure of FIG. 5.

Therefore, it will be understood that the call report server 338 is able to combine the termination reports and the context reports to produce subscriber based voice quality reports.

Use of the call report server will now be described. In a system according to the invention, a network operator controls a system architecture 300 and its associated radio access network 302 and core network 304. The operation of the system architecture 300 is monitored by an analysis and database functionality 312.

In common with the analysis server 340, the data contained within the call report server 338 can be accessed by using a user interface which is able to interrogate the context report database and the termination report database for information associated with a call in respect of each termination involved in the call.

If a subscriber of a network operator makes a call and experiences a problem, for example poor call quality in terms of transmitted and/or received speech or a loss of service, the subscriber may request the network operator to investigate the problem. The problem may be perceived by the subscriber as low speech quality, that is speech having a low MOS value. This can be cause by lost frames which themselves can be caused by packet loss and/or jitter. Such a problem would have associated with it an increased FER at the relevant terminations and/or across the relevant interfaces, for example missing speech frames would also lead to an increase in the parameters LinkFER or TotalFER.

Typically, the network operator will be told the telephone number or numbers of the mobile terminal or terminals involved in the call, the nature of the problem, and the time the call was made. The operator is able to use the time and one of the mobile terminal numbers to determine the global call reference identifier and with this set of information is able to interrogate the databases in the call report server 338 and to identify the context reports within the relevant time interval and thus the corresponding termination reports. The termination reports can then be reviewed in order to assess the quality related parameters associated with each. As a result, in relation to the call it is possible to identify the call route and quality related parameters at each point at which they are measured. Accordingly, the network operator is able to identify the locations at which quality issues occurred contributing to the problem, the nature of the quality issues, and consequently is able to take appropriate measures to seek to avoid the re-occurrence of similar problems.

Accordingly, the call report server 338 may be used to investigate a symptom in which a subscriber cannot hear another subscriber or a call is released by a network. It would be able to reveal, for example, an increase in packet loss ratio or that RTP packets are missing. The measurements made available according to the invention are accurate enough to identify destinations in a network where RTP packets are missing. This may allow a network operator to take remedial action, for example to increase network capacity, investigate network paths to see whether there are hardware failures, or tune up routing protocol parameters.

Furthermore, since, as can be seen in FIG. 6, time stamp information is available in respect of each termination report, then for a particular termination, it is possible to follow call quality in respect of that termination in real time, that is the invention provides real-time visibility of quality issues in respect of separate terminations, and this is done in the user plane level, rather than in respect of the subscriber level. In other words, each connection or codec or interface or destination may be followed in real time, independent of specific subscribers. The time resolution in which this can be investigated can be flexible and can be one hour or even one minute.

The invention enables investigation of the route of a call and the service level at every transcoding point involved.

It will be seen that the network operator is able to make work flow queries of the call report server 338 based on the time a problem occurred and a subscriber number such as IMSI or a global call reference number. In carrying out a work flow query every termination related to this call can be reported on.

It should be noted that the analysis server 340 and the call report server 338 are kept as separate functionalities from the gateway and switching capabilities of the communication system in order that dedicated servers with a sufficient amounts of processing power can be provided to carry out the necessary processing. This means that other elements in the system such as hardware which is dedicated to the tasks of, for example, call switching and routing, are not used to carry out the processing and storage tasks involved in generating call reports. Therefore, the invention is scalable to enable it to handle greater numbers of network elements if this is required.

Although the invention has been described in terms of a call involving speech, it may equally be applied to data calls. In such a case, the quality related parameters will not be MOS values or R-values but will instead by ones reflecting quality in a data call, for example relating to packet loss.

It will be apparent that this implementation shows a 3G mobile communications system. However, the invention may also be applied to other communication systems, for example a 2G mobile communications system. Furthermore, it may be applied to communications systems which are not mobile.

While preferred embodiments of the invention have been shown and described, it will be understood that such embodiments are described by way of example only. Numerous variations, changes and substitutions will occur to those skilled in the art without departing from the scope of the present invention. Accordingly, it is intended that the following claims cover all such variations or equivalents as fall within the spirit and the scope of the invention.

The invention claimed is:

1. A method of generating communication connection analysis, the method comprising:
   providing control plane information identifying a plurality of terminations established between a transcoding unit of a network element and a remote transcoder involved in a communication connection handled by a mobile communications system, wherein the network element is a decomposed gateway having a part handling bearer connections and a part handling call control;
   providing user plane information involved in the communication connection in respect of the plurality of terminations;
   providing user plane measurement data being associated with respective terminations;
   analyzing, in real time with a digital signal processor (DSP), the user plane measurement data in order to produce respective quality indications for respective ones of the plurality of terminations;
   generating enhanced user plane information incorporating the respective quality indications; and
   associating together the control plane information and the enhanced termination reports.

2. A method according to claim 1 in which the communication connection comprises several terminations which are interconnected by the mobile communications system.

3. A method according to claim 1 in which the network element routes the connection through the user plane.

4. A method according to claim 3 in which the connection is switched through a number of network elements.

5. A method according to claim 1 in which the network element is a gateway.

6. A method according to claim 1 in which the network element comprises a bearer control level which forms contexts and manages physical resource reservation for terminations.

7. A method according to claim 1 in which the user plane information is a termination report.

8. A method according to claim 7 in which the termination report is generated in a first network element which is involved in routing the connection.

9. A method according to claim 7 in which the termination report comprises a context identifier, a termination identifier, a termination start time, a termination stop time, and a gateway identifier.

10. A method according to claim 1 in which the user plane measurement data is provided by transcoding units.

11. A method according to claim 1 in which the user plane information is provided to an analysis server.

12. A method according to claim 1 in which the control plane information comprises data items associated with the gateways being controlled in the connection being routed through the network.

13. A method according to claim 1 in which the control plane information is a context report.

14. A method according to claim 1 in which the control plane information is provided to a call report server.

15. An analysis server operating according to claim 1.

16. A call report server operating according to claim 1.

17. A communication system comprising:
a first network element capable of:
establishing a plurality of terminations involved in a communication connection handled by a mobile communications system;
providing user plane information in respect of the plurality of terminations; and
providing user plane measurement data being associated with respective terminations;
wherein the first network element is a decomposed gateway having a part handling bearer connections and a part handling call control;
a second network element capable of providing control plane information identifying the plurality of terminations established at a transcoding unit of the first network element;
a server capable of analysing in real time with a digital signal processor (DSP) the user plane measurement data in order to produce respective quality indications for respective ones of the plurality of terminations and generate enhanced user plane information incorporating the respective quality indications;
a database wherein the control plane information and the enhanced termination reports are associated together in order to generate communication connection analysis.

18. A computer program, embodied on a non-transitory computer readable medium, the computer program comprising software code that when executed on a computing system, causes the computing system to perform: providing control plane information identifying a plurality of terminations established between a transcoding unit of a network element and a remote transcoder involved in a communication connection handled by a mobile communications system, wherein the network element is a decomposed gateway having a part handling bearer connections and a part handling call control; providing user plane information involved in the communication connection in respect of the plurality of terminations; providing user plane measurement data being associated with respective terminations; analyzing in real time with a digital signal processor (DSP) the user plane measurement data in order to produce respective quality indications for respective ones of the plurality of terminations; generating enhanced user plane information incorporating the respective quality indications; and associating together the control plane information and the enhanced termination reports.

* * * * *